United States Patent
Kanenari et al.

(10) Patent No.: US 6,759,136 B2
(45) Date of Patent: Jul. 6, 2004

(54) RUBBER LAMINATE AND PNEUMATIC TIRE USING THE SAME

(75) Inventors: Daisuke Kanenari, Hiratsuka (JP); Takashi Kakubo, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 146 days.

(21) Appl. No.: 09/901,074

(22) Filed: Jul. 10, 2001

(65) Prior Publication Data

US 2002/0033217 A1 Mar. 21, 2002

(30) Foreign Application Priority Data

Jul. 18, 2000 (JP) ........................................ 2000-222400

(51) Int. Cl.⁷ ............................................. B32B 25/12
(52) U.S. Cl. ...................................... 428/493; 525/302
(58) Field of Search ................................ 428/492, 493; 152/450, 500, 510, 516, 525; 525/302

(56) References Cited

U.S. PATENT DOCUMENTS

| | | | |
|---|---|---|---|
| 4,051,090 A | * 9/1977 | Horowitz et al. | 524/322 |
| 4,125,494 A | * 11/1978 | Schoenberg et al. | 524/773 |
| 4,313,865 A | * 2/1982 | Teramoto et al. | 524/753 |
| 4,990,570 A | * 2/1991 | Saito et al. | 525/254 |
| 5,405,690 A | * 4/1995 | Hirakawa | 428/327 |
| 5,783,625 A | * 7/1998 | Mori et al. | 524/509 |

FOREIGN PATENT DOCUMENTS

| | | | |
|---|---|---|---|
| JP | 58-096666 A | * | 6/1983 |
| JP | 08-269241 A | * | 10/1996 |
| JP | 09-143306 A | * | 6/1997 |
| JP | A-11-100463 | | 4/1999 |
| JP | A-11-116735 | | 4/1999 |

OTHER PUBLICATIONS

JPO Abstract Translation of JP 09–143306–A (Clipped Image No. JP409143306A).*
Machine Translation of JP 09–143306–A.*
Derwent Abstract Translation of JP 08–269241–A (Derwent Acc. No. 1996–515114).*
Machine Translation of JP 08–269241–A.*
"Organic Chemistry", K.P.C. Vollhardt, Ed., New York, 1987, p. 420.*
JPO Abstract Translation of JP 58–096666–A (Clipped Image No. JP358096666A).*

* cited by examiner

*Primary Examiner*—Paul Thibodeau
*Assistant Examiner*—Kevin M. Bernatz
(74) *Attorney, Agent, or Firm*—Arent Fox

(57) ABSTRACT

A rubber laminate strengthening the bonding strength at a high temperature and under high strain by adjusting the formulation of the bonding rubber arranged between a hydrogenated NBR composition and general diene-based rubber.

4 Claims, No Drawings

RUBBER LAMINATE AND PNEUMATIC TIRE USING THE SAME

BACKGROUND OF THE INVENTION

1. Field of the Invention

The present invention relates to a rubber laminate and a pneumatic tire using the same, more particularly relates to a rubber laminate making improvements in the bonding rubber layer used between a hydrogenated NBR composition and a general diene-based rubber and a pneumatic tire using the same.

2. Description of the Related Art

The present inventors took note of the usefulness of hydrogenated NBR compositions and previously provided various rubber products by laminating them with general diene-based rubbers. Such hydrogenated NBR compositions, however, suffer from a problem in respect to the bondability with general diene-based rubbers. The inventors have proposed several effective bonding rubber compositions for improving the bondability (Japanese Unexamined Patent Publication (Kokai) No. 11-100463, Japanese Unexamined Patent Publication (Kokai) No. 11-116735, etc.) In the case of a run-flat tire etc. using a hydrogenated NBR composition for the reinforcing liner of the tire, however, since the tire is used at extremely high temperatures and under high strain, the previously proposed bonding rubber compositions were still insufficient in terms of bondability. For example, the running performance at the time of a flat tire (run-flat performance) was insufficient.

SUMMARY OF THE INVENTION

An object of the present invention is to provide a rubber laminate greatly improving the bonding strength at a high temperature and under high strain by adjusting the formulation of the bonding rubber arranged between a hydrogenated NBR composition and general diene-based rubber and a pneumatic tire using the same.

According to a first aspect of the present invention, there is provided a rubber laminate comprising a rubber composition (A), obtained by blending 0 to 120 parts by weight of zinc methacrylate and an organic peroxide into a total of 100 parts by weight of rubber ingredients including at least 40 parts by weight of an ethylenic unsaturated nitrile conjugated diene-based high saturation rubber with a content of conjugated diene units of not more than 30 wt %, and a sulfur-vulcanizable diene-based rubber composition (B) bonded by vulcanization through a bonding rubber composition (C), wherein the bonding rubber composition (C) is comprised of 100 parts by weight of a rubber containing 50 to 85 parts by weight of at least one type of diene-based rubber selected from natural rubber, polyisoprene rubber, polybutadiene rubber, and a conjugated diene-aromatic vinyl copolymer and 15 to 50 parts by weight of the ethylenic unsaturated nitrile-conjugated diene-based high saturation rubber with a content of conjugated diene units of not more than 30 wt % plus 10 to 60 parts by weight of zinc methacrylate, 0.3 to 10 parts by weight of an organic peroxide, and 5 to 50 parts by weight of a co-cross-linking agent having one of an acryl group, methacryl group, and allyl group and liquid at room temperature.

Preferably, the co-cross-linking agent is an aromatic ester having an allyl group.

More preferably, in the bonding rubber composition (C), first the ethylenic unsaturated nitrile-conjugated diene-based high saturation rubber with a content of conjugated diene units of not more than 30 wt % is mixed with the zinc methacrylate and then this composition is mixed with the diene-based rubber and other compounding agents.

Still more preferably, the bonding rubber composition (C) includes 5 to 50 parts by weight of an aromatic petroleum resin having an average molecular weight of 300 to 1500, a softening point of 50 to 160° C., and an iodine absorption value of at least 20 g/100 g.

According to a second aspect of the invention, there is provided a pneumatic tire using the above rubber laminate.

According to a third aspect of the present invention, there is provided a safety tire using the rubber composition (A) for a crescent-shaped reinforcing rubber layer of a side part and arranging around it the bonding rubber composition (C) of an average thickness of 0.2 to 1.5 mm.

According to a fourth aspect of the present invention, there is provided a safety tire having a run-flat performance using the rubber composition (A) for a crescent-shaped reinforcing rubber layer of a side part and an inner liner and arranging the bonding rubber composition (C) of an average thickness of 0.2 to 1.5 mm between them and a carcass.

DESCRIPTION OF THE PREFERRED EMBODIMENTS

In the present invention, when vulcanizing and bonding a rubber composition (A), obtained by blending 0 to 120 parts by weight of zinc methacrylate and an organic peroxide into a total of 100 parts by weight of rubber ingredients including at least 40 parts by weight of an ethylenic unsaturated nitrile conjugated diene-based high saturation rubber with a content of conjugated diene units of not more than 30 wt %, and a general-use sulfur vulcanizable diene-based rubber composition (B), by using a bonding rubber composition (C) comprised of 100 parts by weight of a rubber containing 50 to 85 parts by weight of at least one type of diene-based rubber selected from natural rubber, polyisoprene rubber, polybutadiene rubber, and a conjugated diene-aromatic vinyl copolymer and 15 to 50 parts by weight of the ethylenic unsaturated nitrile-conjugated diene-based high saturation rubber with a content of conjugated diene units of not more than 30 wt % plus 10 to 60 parts by weight of zinc methacrylate, 0.3 to 10 parts by weight of an organic peroxide, and 5 to 50 parts by weight of a co-cross-linking agent having one of an acryl group, methacryl group, and allyl group and liquid at room temperature, it becomes possible to greatly improve the bondability of the rubber laminate, particularly at a high temperature and under high strain. Therefore, when using this laminated structure for a pneumatic tire, the inventors discovered that the run-flat performance can be greatly improved.

In particular, in the present invention, in the bonding rubber composition (C), by blending in a liquid co-cross-linking agent, the viscosity of the bonding rubber when not yet vulcanized is reduced, the molecular motion at the bonding interface is improved and mutual diffusion promoted, and strong cross-linking is caused by the reaction during vulcanization, so the hardness of the bonding rubber after vulcanization is not impaired. Therefore, it becomes possible to ease the stress concentration at the interface with the high hardness hydrogenated NBR rubber composition and greatly improve the bondability. In particular, it becomes possible to improve the bondability at a high heat and high strain and greatly improve the run-flat performance.

The hydrogenated NBR (ethylenic unsaturated nitrile-conjugated diene-based high saturation copolymer rubber) used for the rubber laminate of the present invention is preferably one with a content of conjugated diene units of not more than 30 wt %, particularly of not more than 20 wt %. If the content of conjugated diene units is over 30 wt %, that is, if the partial hydrogenation rate is less than about 50%, the strength of the rubber composition becomes insufficient.

The above hydrogenated NBR is already known. A copolymer of acrylonitrile, methacrylonitrile, or other ethylenic unsaturated nitrites with 1,3-butadiene, isoprene, 1,3-pentadiene, or other conjugated dienes; a terpolymer with a monomer able to copolymerize with the above two types of monomers, for example, a vinyl aromatic compound, (meth) acrylic acid, alkyl(meth)acrylate, alkoxyalkyl(meth) acrylate, and cyanoalkyl(meth)acrylate, specifically, an acrylonitrile-butadiene copolymer rubber, an acrylonitrile-isoprene copolymer rubber, an acrylonitrile-butadiene-isoprene copolymer rubber, an acrylonitrile-butadiene-acrylate copolymer rubber, an acrylonitrile-butadiene-acrylate-methacrylate copolymer rubber, etc. may be mentioned. These rubbers include 30 to 60 wt % of ethylenic unsaturated nitrile units. Partial hydrogenation of the conjugated diene units or other means are used to reduce the conjugated diene units to not more than 30 wt %, preferably not more than 20 wt %.

The method of mixing the predetermined amount of zinc methacrylate (including form of zinc dimethacrylate) into the hydrogenated NBR composition of the present invention is not particularly limited, but it is possible to use a mixer ordinarily used in the rubber industry such as a roll, Banbury mixer, kneader, single-screw kneader, twin-screw kneader, etc. Further, in addition to the method of mixing the zinc methacrylate directly into the hydrogenated NBR, the method may also be adopted of first mixing zinc oxide, zinc carbonate, and other zinc compounds into the hydrogenated NBR to fully disperse them, then mixing or causing absorption of methacrylic acid to produce zinc methacrylate in the polymer. This method is preferable in that an extremely good dispersion of zinc methacrylate is obtained. Further, it is also possible to use a composition in which zinc methacrylate and zinc compounds are predispersed in hydrogenated NBR. This is available in the ZSC® series of Nippon Zeon, for example, ZSC2295, ZSC2295N, ZSC2395, and ZSC2298.

The hydrogenated NBR composition of the present invention is preferably cross-linked by an organic peroxide. As the organic peroxide, one used for the peroxide vulcanization of an ordinary rubber may be used. For example, dicumyl peroxide, di-t-butyl peroxide, t-butylcumyl peroxide, benzoyl peroxide, 2,5-dimethyl-2,5-di(t-butylperoxy)hexine, 2,5-dimethyl-2,5-di(benzoylperoxy)hexane, 2,5-dimethyl-2,5-mono(t-butylperoxy)hexane, $\alpha$, $\alpha'$-bis(t-butylperoxy-m-isopropyl)benzene, etc. may be mentioned. These peroxides may be used alone or in combinations of two or more types and are preferably blended in amounts of 0.2 to 10 parts by weight, preferably 0.2 to 6 parts by weight, with respect to 100 parts by weight of rubber.

The hydrogenated NBR composition may for example have suitably blended into it for example carbon black, silica, calcium carbonate, talc, or other fillers, triallyl isocyanulate, higher esters of methacrylic acid, diallyl esters of phthalic acid, m-phenylene bismaleimide, 1,2-polybutadiene, and other cross-linking aids, and other compounding agents generally used in the rubber industry such as plasticizers, oils, antioxidants, stabilizers, adhesives, resins, processing aids, coloring agents, etc.

For the hydrogenated NBR, zinc methacrylate, and organic peroxide ingredients blended into the bonding rubber composition (C) of the present invention, a hydrogenated NBR, zinc methacrylate, and organic peroxide basically the same as those mentioned above are used. Further, the amount of the hydrogenated NBR blended is preferably made 15 to 50 parts by weight per 100 parts by weight of the total bonding rubber. If the amount blended is less than 15 parts by weight, the desired bondability with respect to the hydrogenated NBR rubber composition (A) cannot be obtained, while if over 50 parts by weight, the bondability with the sulfur-vulcanizable diene-based rubber composition (B) takes no sufficient effect. Further, the amount of the zinc methacrylate blended is preferably made 10 to 60 parts by weight with respect to 100 parts by weight of the total bonding rubber. If the amount blended is less than 10 parts by weight, the bondability is insufficient, while if over 60 parts by weight, the rubber becomes hard and the processability and bondability become poor. Further, the amount of the organic peroxide blended is preferably 0.3 to 10 parts by weight with respect to 100 parts by weight of the total bonding rubber from the viewpoints of processability and bondability.

Further, as the co-cross-linking agent blended into the bonding rubber composition (C) of the present invention, one having one of an acryl group, methacryl group, and allyl group and liquid at room temperature, for example, triallyl isocyanulate, a higher ester of methacrylic acid, and a diallyl ester of phthalic acid may be used. In particular, a diallyl ester of phthalic acid is preferable. The amount of the co-cross-linking agent blended is preferably 5 to 50 parts by weight with respect to 100 parts by weight of the total bonding rubber. If the amount of the co-cross-linking agent blended is less than 5 parts by weight, the bondability at a high temperature is insufficient, while if over 50 parts by weight, the composition becomes sticky at the time of kneading and the processability becomes poor.

In the bonding rubber composition of the present invention, if employing a process of first mixing the ethylenic unsaturated nitrile conjugated diene-based high saturation rubber with a content of conjugated diene units of not more than 30 wt % and the zinc methacrylate and then blending this composition with the diene-based rubber and other compounding agents (two-step mixing method), the processability and bondability of the bonding rubber composition are both improved.

Further, in this mixing method, instead of first mixing the ethylenic unsaturated nitrile conjugated diene-based high saturation rubber with a content of conjugated diene units of not more than 30 wt % and the zinc methacryalte, if using a composition in which these are predispersed, for example, the ZSC® Series made by Nippon Zeon, effects of improvement the same as the two-step mixing can be obtained even with one-step mixing. This is even more preferable.

Further, the processability and bondability are further improved if adding 5 to 50 parts by weight of an aromatic petroleum resin having an average molecular weight of 300 to 1500, a softening point of 50 to 160° C., and an iodine absorption value of 20 g/100 g. Further, the bonding rubber composition may have suitably blended into it, in addition to the above aromatic petroleum resin, compounding agents generally blended into rubber such as carbon, silica, talc, and other fillers, plasticizers, processing aids, resins, antioxidants, cross-linking aids, vulcanization accelerators, and tackifiers.

The rubber laminate of the present invention is extremely strengthened in the bonding function of the bonding rubber composition (C) layer interposed between the hydrogenated NBR rubber composition (A) and the sulfur-vulcanizable diene-based rubber composition (B) even at a high temperature and under high strain, so is extremely useful if made into a pneumatic tire using a laminate structure for various tire members or in particular if made into a safety tire having a run-flat performance using the rubber composition (A) for the crescent-shaped reinforcing rubber layer at the side part and arranging the bonding rubber composition (C) layer around it or if made into a safety tire having a run-flat performance using the rubber composition (A) for the crescent-shaped reinforcing rubber layer of the side part and the inner layer and arranging a bonding rubber composition (C) layer between them and the carcass.

When the rubber laminate of the present invention is used for a safety tire having the above run-flat performance, in all types of safety tires, the thickness of the bonding rubber composition (C) layer is preferably made 0.2 to 1.5 mm. By making the thickness this range, the safety tire can be lightened and the desired superior run-flat performance of the present invention can be obtained, but when made thicker than 1.5 mm, the tire weight increases, so this is not preferred.

EXAMPLES

The present invention will be explained further below with reference to examples, but these examples of course do not limit the scope of the present invention in any way.

Preparation of Test Samples of Table 1

Unvulcanized rubber compositions of the formulations shown in Table 1 were formed into sheets of a size of 15 cm×15 cm and a thickness of 2 mm. Releasing films of widths of about 5 cm were adhered to the ends and sheets of the same dimensions of Formulation n or Formulation p were adhered on top. Plain weave cloths were adhered as backing to the top and bottom of the laminate, and the assemblies were press vulcanized by a 15 cm×15 cm×4 mm mold at 170° C. for 10 minutes. The sheets were cut into widths of 25 mm in a direction perpendicular to the Mylar films to prepare the test samples.

Test Methods of Table 1

1) Processability: "VG (very good)" shows no close adhesion or sticking to the rotor of a Banbury mixer or roll, "G (good)" shows some sticking to the roll, but clean peeling off, "F. (fair)" shows some rubber remaining on the rotor of a Banbury mixer or sticking to the roll, and "P (poor)" shows rubber remaining in the Banbury mixer or considerably sticking to the roll and difficulty in kneading work.

2) Bondability: The portions where the Mylar films were inserted were gripped at the top and bottom and peeled off at a rate of 50 mm/min to observe the state of peeling visually. The test was conducted at two temperatures of room temperature (23° C.) and 120° C. "VG (very good)" indicates the rubber material was destroyed and the bonding interface did not appear at all, "G (good)" that the interface appeared just a little, "F (fair)" that there was both peeling of the interface and destruction of the material, and "P (poor)" that there was complete peeling of the interface.

Examples—Part 1

The processability of the bonding rubbers and the bondabilities of the rubber laminates are shown in the following Table 1.

TABLE 1

Bonding Rubber Formulations and Examples-Part 1

| Ingredients | Comp. Ex. 1. Form. a | Comp. Ex. 2. Form. b | Comp. Ex. 3. Form. c | Comp. Ex. 4. Form. d | Ex. 1. Form. e | Comp. Ex. 5. Form. f | Ex. 2. Form. g | Ex. 3. Form. h | Ex. 4 Form. i(1) | Ex. 4 Form. i(2) | Comp. Ex. 6. Form. j | Comp. Ex. 7. Form. k |
|---|---|---|---|---|---|---|---|---|---|---|---|---|
| Natural rubber[1] | 60 | 60 | 60 | 60 | 60 | 60 | 60 | 60 | | 60 | 40 | 90 |
| NBR[2] | 40 | 40 | — | — | — | — | — | — | | | — | — |
| Hydrogenated NBR[3] | — | — | 40 | 40 | 40 | 40 | 40 | 40 | 40 | | 60 | 10 |
| Zinc methacrylate[4] | 10 | 10 | 0 | 30 | 30 | 30 | 30 | 30 | 30 | | 30 | 30 |
| Carbon black[5] | 50 | 50 | 30 | 30 | 30 | 30 | 30 | 30 | | 30 | 30 | 30 |
| Zinc oxide[6] | 5 | 5 | 5 | 5 | 5 | 5 | 5 | 5 | | 5 | 5 | 5 |
| Stearic acid[7] | 1.5 | 1.5 | 1.5 | 1.5 | 1.5 | 1.5 | 1.5 | 1.5 | | 1.5 | 1.5 | 1.5 |
| Antioxidant 1[8] | 2 | 2 | 2 | 2 | 2 | 2 | 2 | 2 | | 2 | 2 | 2 |
| Aromatic petroleum | | | | | | | | | | | | |

TABLE 1-continued

|  |  | | | | | | | | | | | | |
|---|---|---|---|---|---|---|---|---|---|---|---|---|---|
| resin[9] | | 30 | 30 | — | — | — | — | — | — | — | 20 | 20 | 20 |
| Organic peroxide[10] | | 3 | 3 | 3 | 3 | 3 | 3 | 3 | 3 | 3 | 3 | 3 | 3 |
| Co-cross-linking agent 1[11] | | — | 15 | 15 | 2 | 15 | 60 | — | 15 | | 15 | 15 | 15 |
| Co-cross-linking agent 2[12] | | — | — | — | — | — | — | 15 | — | | — | — | — |
| Mixing method | | 1 step | 1 step | 1 step | 1 step | 1 step | 1 step | 1 step | 1 step | 2 steps | 1 step | 1 step | 1 step |
| Processability | | F | F | G | F | G | P | G | G | VG | | G | VG |
| Bonding test | | | | | | | | | | | | | |
| Bondability with rubber layer of Form. n | Room temp. | G | G | G | G | VG | VG | VG | VG | VG | | VG | P |
| | 120° C. | P | F | P | P | VG | VG | G | G | VG | | VG | P |
| Bondability with rubber layer of Form. p | Room temp. | VG | VG | VG | VG | VG | G | VG | VG | VG | | G | VG |
| | 120° C. | G | G | G | G | G | G | G | G | G | | P | G |

Notes: The following products of the following manufacturers were used for the ingredients in the above table:
[1] RSS#3
[2] Nipol DN 401 made by Nippon Zeon
[3] Zetpol 2030L made by Nippon Zeon
[4] R-20S made by Asada Chemical
[5] Seast 300 made by Tokai Carbon
[6] Zinc oxide #3 made by Seido Chemical
[7] Beads Stearic Acid made by Kao Corporation
[8] Nocrac 6C made by Ouchi Shinko Chemical Industrial
[9] FR-120 made by Fuji Kosan
[10] Parkadox 14/40 made by Kayaku Akzo
[11] DAP monomer made by Osaka Soda
[12] Acriester TMP made by Mitsubishi Rayon The compositions of the Formulation n and the Formulation p in the above Table 1 were those shown in the following Table 2 and Table 3.

TABLE 2

Formulation of Reinforcing Rubber Layer

| | Formulation l | Formulation m | Formulation n | Formulation o |
|---|---|---|---|---|
| Natural rubber[1] | 50 | 50 | | |
| Polybutadiene rubber[2] | 50 | 50 | | |
| Hydrogenated NBR[3] | | | 100 | 100 |
| Zinc methacrylate[4] | | | 60 | 85 |
| Carbon black[5] | 65 | 80 | | |
| Zinc oxide[6] | 5 | 5 | | |
| Stearic acid[7] | 1.5 | 1.5 | | |
| Antioxidant 1[8] | 2 | 2 | | |
| Antioxidant 2[9] | | | 1.5 | 1.5 |
| Sulfur[10] | 6 | 6 | | |
| Vulcanization accelerator[11] | 2 | 2 | | |
| Organic peroxide[12] | | | 4 | 4 |

Notes: The following products of the following manufacturers were used for the ingredients in the above table:
[1] RSS#3
[2] Nipol BR-1220 made by Nippon Zeon
[3] Zetpol 2030L made by Nippon Zeon
[4] R-20S made by Asada Chemical
[5] Seast 300 made by Tokai Carbon
[6] Zinc oxide #3 made by Seido Chemical
[7] Beads Stearic Acid made by Kao Corporation
[8] Nocrac 6C made by Ouchi Shinko Chemical Industrial
[9] Naugaurd 445 made by Uniroyal
[10] Crystex HSO T20 made by Flexsis
[11] Noccelar NS-F made by Ouchi Shinko Chemical Industrial
[12] Parkadox 14/40 made by Kayaku Akzo

TABLE 3

Carcass and Inner Liner Rubber Formulations

| | Formulation p | Formulation q | Formulation r |
|---|---|---|---|
| Natural rubber[1] | 50 | 20 | |
| Polybutadiene rubber[2] | 20 | | |
| Styrene-butadiene rubber[3] | 30 | | |
| Brominated butyl rubber[4] | | 80 | 20 |
| Hydrogenated NBR[5] | | | 80 |
| Zinc methacrylate[6] | | | 5 |
| Carbon black[7] | 60 | 60 | 60 |
| Zinc oxide[8] | 5 | 4 | 1 |
| Stearic acid[9] | 1 | 1 | |
| Aromatic oil[10] | 10 | 5 | |
| Antioxidant 1[11] | 1 | | |
| Antioxidant 2[12] | | | 1.5 |
| Sulfur[13] | 3 | 1 | |
| Vulcanization accelerator[14] | 1.5 | 1 | |
| Organic peroxide[15] | | | 4 |

Notes: The following products of the following manufacturers were used for the ingredients in the above table:
[1] RSS#3
[2] Nipol BR-1220 made by Nippon Zeon
[3] Nipol 1502 made by Nippon Zeon
[4] Bromobutyl 2255 made by Exxon Chemical
[5] Zetpol 2030L made by Nippon Zeon
[6] R-20S made by Asada Chemical
[7] Diablack E made by Chubu Carbon
[8] Zinc oxide #3 made by Seido Chemical
[9] Beads Stearic Acid made by Kao Corporation
[10] Extract No. 4S made by Showa Shell Oil
[11] Nocrac 224 made by Ouchi Shinko Chemical Industrial
[12] Naugaurd 445 made by Uniroyal
[13] Crystex HSO T20 made by Flexsis
[14] Noccelar NS-F made by Ouchi Shinko Chemical Industrial
[15] Parkadox 14/40 made by Kayaku Akzo Preparation of Test Tires of Table 4

Reinforcing rubber layers, bonding rubber layers, and inner liner layers of the formulations and thicknesses shown in the examples of Table 4 were prepared, arranged, and bonded to give predetermined relative arrangements so as to fabricate run-flat tires of a tire size 225/60R16 98H. These were used as the test tires.

Test Methods of Table 4

1) Run-flat travel distance: The test tires were mounted as the front wheels of a front engine rear wheel drive passenger car with a displacement of 2500 cc and run on in a state of 0 kPa air pressure at a speed of 80 km. The distance traveled until the tire broke was indicated indexed to a tire of the reference example as 100. The larger the value, the better the run-flat travel performance indicated.

Examples—Part 2

The results of the run-flat travel performance are shown in the following Table 4.

TABLE 4

Examples-Part 2 (Tire Size: 225/60R16 98H)

|  | Ref. Ex. | Comp. Ex. 1 | Comp. Ex. 2 | Comp. Ex. 3 | Ex. 1 | Ex. 2 | Ex. 3 | Comp. Ex. 4 | Ex. 4 |
|---|---|---|---|---|---|---|---|---|---|
| Reinforcing rubber layer formulation (Table 2) | Form. 1 | Form. 1 | Form. n | Form. n | Form. n | Form. o | Form. o | Form. o | Form. o |
| Bonding rubber formulation (Table 1) | — | — | — | Form. a | Form. h | Form. h | Form. h | Form. h | Form. h |
| Inner liner formulation (Table 3) | Form. q | Form. q | Form. q | Form. q | Form. q | Form. q | Form. q | Form. q | Form. r |
| Hardness of reinforcing liner (JIS A hardness) | 85 | 85 | 85 | 85 | 92 | 92 | 92 | 92 | 92 |
| Thickness of reinforcing rubber layer (mm) | — | — | — | 0.5 | 0.5 | 0.5 | 0.5 | 2 | 0.5 |
| Max. thickness of reinforcing liner*1 (mm) | 12 | 8 | 12 | 12 | 12 | 10 | 8 | 12 | 8 |
| Tire weight (kg) | 12.0 | 11.1 | 12.0 | 12.1 | 12.1 | 11.6 | 11.1 | 12.3 | 10.7 |
| Run-flat travel distance*2 (index) | 100 | 20 | 38 | 72 | 208 | 150 | 106 | 74 | 128 |

Notes:
*1) Thickness including bonding rubber layer.
*2) Indexed to Reference Example as 100

From the results of Table 1 and Table 4, it is shown that the rubber laminate of the present invention and the tire using the same both exhibit the desired superior characteristics.

While the invention has been described with reference to specific embodiment chosen for purpose of illustration, it should be apparent that numerous modifications could be made thereto by those skilled in the art without departing from the basic concept and scope of the invention.

What is claimed is:

1. A rubber laminate comprising:

a rubber composition (A), obtained by blending 0 to 120 parts by weight of zinc methacrylate and an organic peroxide into a total of 100 parts by weight of rubber ingredients including at least 40 parts by weight of an ethylenic unsaturated nitrile conjugated diene type highly saturated rubber in which the content of conjugated diene units in the polymer chain is not higher than 30% by weight, and a sulfur vulcanizable diene-based rubber composition (B) bonded by vulcanization through a bonding rubber composition (C), wherein the bonding rubber composition (C) is comprised of 100 parts by weight of a rubber containing 50 to 85 parts by weight of at least one type of diene-based rubber selected from a group consisting of natural rubber, polyisoprene rubber, polybutadiene rubber, and a conjugated diene-aromatic vinyl copolymer; 15 to 50 parts by weight of an ethylenic unsaturated nitrile-conjugated diene-based high saturation rubber in which the content of conjugated diene units in the polymer chain is not higher than 30% by weight; 10 to 60 parts by weight of zinc methacrylate, 0.3 to 10 parts by weight of an organic peroxide; and 5 to 50 parts by weight of a co-cross-linking agent having one of an acryl group, methacryl group, and allyl group wherein the co-cross-liking agent is liquid at room temperature.

2. A rubber laminate as set forth in claim 1, wherein said co-cross-linking agent is an aromatic ester having an allyl group.

3. A rubber laminate as set forth in claim 1, wherein in said bonding rubber composition (C), first the ethylenically unsaturated nitrile-conjugated diene type highly saturated rubber in which the content of conjugated diene units in the polymer chain is higher than 30% by weight is mixed with the zinc methacrylate and then this composition is mixed with the diene-based rubber and other compounding agents.

4. A rubber laminate as set forth in claim 1, wherein the bonding rubber composition (C) includes 5 to 50 parts by weight of an aromatic petroleum resin having an average molecular weight of 300 to 1500, a softening point of 50 to 160° C., and an iodine absorption value of at least 20 g/100 g.

* * * * *